United States Patent [19]

Amin et al.

[11] 4,082,906
[45] Apr. 4, 1978

[54] LOW TEMPERATURE FIRED CERAMIC CAPACITORS

[75] Inventors: Rajnikant B. Amin, Valencia, Calif.; Harlan Urie Anderson, Rolla, Mo.; Charles E. Hodgkins, Lake View Terrace, Calif.

[73] Assignee: San Fernando Electric Manufacturing Company, San Fernando, Calif.

[21] Appl. No.: 768,182

[22] Filed: Feb. 14, 1977

[51] Int. Cl.$^2$ .................. H01B 3/12; H01G 1/01; C04B 35/46
[52] U.S. Cl. .................. 428/539; 106/39.7; 106/39.8; 106/46; 106/73.1; 106/73.31; 252/63.5; 156/89; 361/309; 361/321
[58] Field of Search .......... 428/539; 106/73.3, 73.31, 106/73.1, 46, 39.7, 39.8; 252/63.5, 62.9; 156/89; 361/309, 321

[56] References Cited

U.S. PATENT DOCUMENTS

| | | | |
|---|---|---|---|
| 2,402,518 | 6/1946 | Wainer | 106/73.3 |
| 2,443,211 | 6/1948 | Wainer et al. | 106/73.31 |
| 2,972,570 | 2/1961 | Haas et al. | 106/73.3 X |
| 3,035,927 | 5/1962 | Janulionis | 106/73.3 |
| 3,069,276 | 12/1962 | Domanski | 106/73.3 |
| 3,074,804 | 1/1963 | Planer et al. | 106/73.3 |
| 3,179,525 | 4/1965 | Welsby et al. | 106/73.3 |
| 3,529,978 | 9/1970 | Taylor et al. | 106/73.31 |
| 3,612,963 | 10/1971 | Piper | 361/309 X |
| 3,753,911 | 8/1973 | Walker et al. | 106/73.3 X |
| 3,862,046 | 1/1975 | Walker et al. | 106/73.31 X |
| 3,969,252 | 7/1976 | Utsumi et al. | 361/321 X |

Primary Examiner—Harold Ansher
Attorney, Agent, or Firm—Ralph B. Pastoriza

[57] ABSTRACT

A multi-layer ceramic capacitor is characterized by a ceramic composition including barium titanate and lithium fluoride as essential ingredients resulting in the capability of sintering the composition at temperatures below 1100° C. As a consequence, the electrodes for the capacitor can be formulated from pure silver or a silver palladium composition in which the major component is silver thereby decreasing the expense of such capacitors as compared to those requiring platinum, gold, or mixtures of these precious metals and/or similar precious metals in making up the electrodes.

7 Claims, 5 Drawing Figures

LOW TEMPERATURE FIRED CERAMIC CAPACITORS

This invention relates generally to electrical capacitors and more particularly to compositions and processes in forming multi-layer ceramic capacitors as may typically be used in miniature hybrid circuit modules.

BACKGROUND OF THE INVENTION

A conventional multi-layer ceramic capacitor is typically formed as follows. A ceramic powder is dispersed in a polymeric material and the resulting slurry of the ceramic in the polymeric material with solvent is cast into a film form. This film is known as ceramic tape and may be cast anywhere from 0.5 mil up to 25 mils and even higher thicknesses. The ceramic tape has almost all of its solvent evaporated off before processing.

Metal electrodes are provided in a paste form. The metal particles are dispersed in a plasticized polymeric material with solvent to form a silk-screenable paste. The silk-screenable paste may contain from 40% to 80% metal powder by weight. This electrode paste is screened on the ceramic tape and dried. The tape itself may be diced or cut into individual tape pieces which are then stacked in such a way that individual capacitors are in parallel and the values add to each other.

The stack is then pressed to make a monolithic structure. Each individual unit is called a ceramic chip. The green chip is slowly heated to about 260° C to burn off the plastic and then the ceramic is sintered at an appropriate temperature to achieve a fired monolithic multi-layer ceramic capacitor.

Alternate electrodes silk-screened onto the initial tape pieces forming the monolithic multi-layer ceramic capacitor are exposed at the two ends of the resulting chip and are separated by the ceramic dielectric. These electrode ends are connected to outside leads by fired on termination materials such as silver or palladium-silver. Leads are then normally soldered to the termination to make proper electrical connection.

Most conventional ceramic compositions or multi-layer ceramic capacitors contain barium titanate as a major starting chemical component. Small additions of compounds such as calcium zirconate, strontium titanate, bismuth titanate, calcium stannate, bismuth stannate, bismuth zirconate, lead titanate, barium zirconate, and the like change the electrical properties of barium titanate based ceramic compositions. For example, an 8–10% by weight addition of calcium zirconate to barium titanate shifts the Curie peak to room temperature in such a way that a temperature coefficient of capacitance can be obtained of from +20% to −56% over a temperature range of from 10° C to 85° C with 25° C as a reference temperature.

Many other oxide compounds such as manganese oxide, silicon oxide, aluminum oxide, zirconium oxide, titanium dioxide, cobalt oxide, nickel oxide and the like are added to the ceramic composition in order to improve the sintering and electrical properties of the ceramic bodies. These ceramics have high dielectric constants up to 11,000 to 12,000. The high dielectric constant of the ceramic makes it attractive material for capacitor application.

Conventional ceramic compositions of the foregoing type for multi-layer ceramic capacitors are normally fired or sintered in air in the range of from 1200° C to 1400° C in forming the monolithic chip. These temperatures and air atmosphere require that the electrodes silk-screened onto the ceramic tape pieces comprise precious metals such as alloys of platinum, palladium and gold. In this respect, it is essential that the metal forming the electrode remain in conducting form while buried in the ceramic during the firing or sintering process. It is also essential that the metal electrode not adversely react with the ceramic and degrade the electrical properties of the ceramic. To maintain the electrode material conductivity it has to remain continuous during the firing or sintering of the ceramic. Any melting of the electrode during the sintering process results in discontinuities so that it will not have the necessary conducting properties for multi-layer ceramic capacitors.

While conventional precious metal electrodes such as platinum, palladium and gold and alloys thereof meet the necessary characteristics of continuity and inertness with respect to the ceramic material, they are relatively expensive and increase materially the overall cost of manufacture of multi-layer capacitors.

Typical prior art examples of ceramic capacitor material are found in U.S. Pat. Nos. 2,402,518; 2,443,211; 3,529,978; and 3,612,963.

BRIEF DESCRIPTION OF THE PRESENT INVENTION

With the foregoing considerations in mind, the present invention contemplates the provision of an improved multi-layer ceramic capacitor characterized by a ceramic composition such that the same can be fired or sintered at temperatures below 1100° C and preferably between 800° C and 900° C. At such sintering temperatures, it is then possible to utilize substantially 100% silver in forming the electrodes for the capacitor with the end result that a substantial savings in manufacturing cost can be realized.

The melting point of pure silver is in the area of 960° C. By adding small amounts of palladium, the resulting alloy exhibits a somewhat higher melting point and in accord with the present invention where the sintering temperature exceeds 960° C, palladium is added to the silver.

In all embodiments of the present invention, however, the majority of the component making up the electrodes is silver so that even though some palladium may be used, there is still a substantial saving in manufacturing costs.

The essence of our invention resides in the discovery that the sintering or firing temperature can be carried out below 1100° C by adding to the basic barium titanate making up the ceramic composition, lithium fluoride and in many instances other additives. More particularly, we have found that addition of from 0.25% to 10% by weight of lithium fluoride to barium titanate allows the sintering or firing of the resultant ceramic composition to be achieved at from 750° C to 1100° C. The resulting fired or sintered ceramic is dense and has useful electrical properties for capacitor applications.

DETAILED DESCRIPTION OF THE INVENTION AND EXAMPLES

Figure 1:
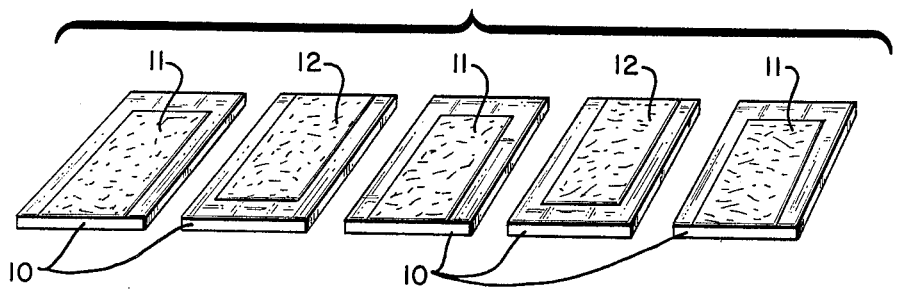
FIG. 1 illustrates in perspective view a series of separate pieces of ceramic tape having electrodes silk-screened thereon.

Referring first to FIG. 1, there is shown at 10 a plurality of ceramic tape pieces cut from a ceramic tape formed essentially as described heretofore except that the ceramic composition includes in addition to basic barium titanate, lithium fluoride. In all of the ceramic compositions contemplated by the present invention, there is included at least 50% barium titanate by weight and from 0.25% to 10% by weight lithium fluoride. In many of the compositions, further additives normally totalling 5% or less are also included.

Each of the pieces of tape 10 of FIG. 1 has silk-screened on it appropriate electrodes in a pattern such that the electrodes 11 terminate at the front edges of the pieces while the electrodes 12 terminate at the rear edges. These electrodes, in accord with this invention, may comprise 100% pure silver or, depending upon sintering temperature, a mixture of silver and palladium. In all of the embodiments of this invention, however, the electrodes will constitute at least 50% silver.

Figure 2:
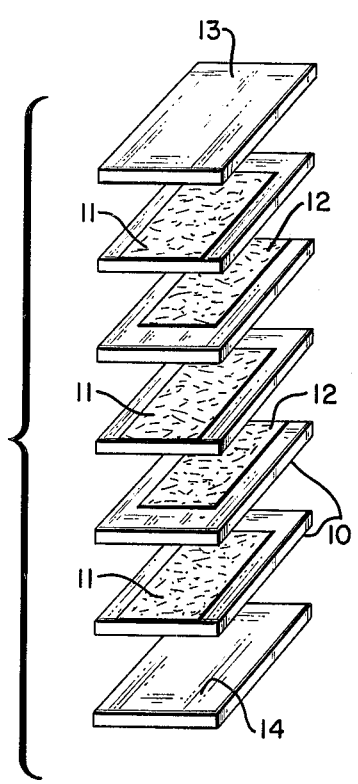
FIG. 2 illustrates an exploded view of a stacking of the ceramic pieces of FIG. 1 together with end ceramic tape pieces preparatory to forming a monolithic multi-layer capacitor.

FIG. 2 illustrates the manner in which the pieces of FIG. 1 are to be stacked in forming the multi-layer capacitor. Thus, the ceramic pieces 10 with the electrodes 11 terminating adjacent the front edge are sandwiched between the remaining pieces with electrodes 12 terminating at the rear edges. Appropriate top and bottom ceramic pieces 13 and 14 without any electrode material deposited thereon form the top and bottom of the final capacitor chip.

Figure 3:
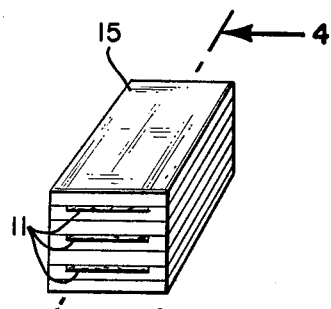
FIG. 3 shows the various pieces of FIG. 2 in stacked relationship.
Figure 4:
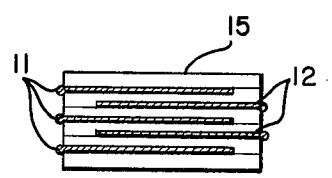
FIG. 4 is a cross section taken in the direction of the arrows 4—4 of FIG. 3.

FIGS. 3 and 4 illustrate the manner in which the respective deposited electrodes are exposed on opposite ends of the stacked array such that they may be respectively electrically connected together in parallel to form capacitive plates which add.

While only a few layers or pieces are illustrated in the drawings for simplicity, there may be provided many more of the pieces and plates interleaved as described; for example, 18 or 20.

The stacked array is fired or sintered at a temperature below 1100° C in certain instances and preferably between 800° and 900° C. Where the sintering temperature is in the area of 900° C or less, pure silver may be used for the electrodes.

Figure 5:
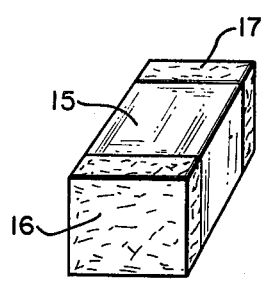
FIG. 5 illustrates in perspective view the stacked pieces of FIGS. 3 and 4 after sintering and with appropriate end electrodes added to provide the final capacitor chip.

FIG. 5, as described heretofore, shows the completed monolithic capacitor chip wherein end electrodes 16 and 17 are provided, these electrodes effecting the described electrical connections between the terminal ends of the plates at opposite ends of the layers as described in FIG. 4. Appropriate leads can subsequently be soldered to the end electrodes 16 and 17.

We have found that the unique nature of the barium titanate plus lithium fluoride system results in a Curie peak shift without the addition of conventional shifters such as calcium zirconate, calcium stannate, and so forth. Further, the basic system of barium titanate and lithium fluoride provides a temperature coefficient of capacitance meeting the requirements of the Z5U characteristic defined by Electronic Industries Association of the USA for general purpose ceramic capacitors. We have also discovered that addition by weight of, for example, 0.1% to 5% barium fluoride and/or 0.1% to 30% strontium titanate have beneficial effects on the barium titanate plus lithium fluoride system with respect to electrical properties.

In our experimentation, we initially dry mixed with a commercial barium titanate 0.5, 1.0, 1.5 and 2.0 weight percent of lithium fluoride. The mixture was pressed into ½ inch diameter discs. These discs were placed on zirconia refractory plates in an electrically heated furnace. After sintering, silver paste was fired on both sides to form two electrodes.

The electrical properties of these discs are summarized as follows:

| Ceramic Composition | | Sintering Temp. and Time | characteristics |
|---|---|---|---|
| 99.5% | Barium titanate | 850° C 8 hours | Dielectric constant, $K_r = 3200$ |
| 0.5% | Lithium fluoride | | Dissipation factor = 2% Curie peak at 70° C |
| 99.0% | Barium titanate | 850° C 8 hours | Dielectric constant, $K_r = 4700$ |
| 1.0% | Lithium fluoride | | Dissipation factor = 2% Curie peak at 55° C |
| 98.5% | Barium titanate | 850° C 8 hours | Dielectric constant, $K_r = 5400$ |
| 1.5% | Lithium fluoride | | Dissipation factor = 2% Curie peak at 48° C |
| 98.0% | Barium titanate | 925° C 16 hours | Dielectric constant, $K_r = 6000$ |
| 2.0% | Lithium fluoride | | Dissipation factor = 1.5% Curie peak at 30° C |

These results were sufficient to warrant preparing multi-layer capacitors with silver and silver-palladium electrodes.

Following are several examples of actual tests carried out.

EXAMPLE 1

98% by weight of commercial barium titanate was mixed with 2% by weight of lithium fluoride in a dry blend. The dry blended powder mixture was dispersed in a conventional acrylic plastic film forming formulation. The process used was the well known method of ball milling the slurry and then casting the ceramic tape.

A commercial silver powder of about 1 micron particle size was dispersed in a conventional electrode ink-making vehicle consisting of ethylhydroxy ethyl cellolose, hydrogenated wood rosin, plasticizer and kerosene solvent. The silver metal content was 53% by weight and it was dispersed in the ink vehicle by using a three roll mill.

The ceramic tape was formed with a thickness of 2.0 mil and screened with the above-mentioned silver electrode ink. The ink was dried at 38° C for 24 hours. The individual screened ceramic pieces were then laminated using 6 metal layers separated by 2.0 mil thick green ceramic. Cover layers of 4.0 mil thickness each were used on the top and bottom.

The individual chips were sintered at 900° C for 16 hours on zirconia setters. Conventional silver termination was applied and fired on the chips.

The electric properties obtained were:
Capacitance = 0.248 microfarads
Dissipation Factor = 3.8%
Dielectric constant = 1150

There was some evidence of setter reaction with the chip, which, in all probability was the reason for the relatively low dielectric constant.

EXAMPLE 2

98% by weight barium titanate was dry blended with 2% by weight lithium fluoride and initially calcined at 815° C for 1 hour. The calcined powder was then mixed with an additional 0.5% by weight lithium fluoride in a vibratory energy mill for 6 hours with water media. The water slurry was dried and the dried powder was incorporated with plastic material and cast into a tape as described in Example 1.

Chips were prepared each comprised of six metal layers separated by 3.0 mil ceramic thickness and were fired or sintered and the dissipation factor measured. The setters were treated with the ceramic powder composition to prevent setter reaction. The following dissipation factors resulted for different sintering times, the sintering temperature being 843° C in each instance:

| Time | Dissipation Factor |
| --- | --- |
| 2 hours | 10% |
| 4 hours | 5.6% |
| 7 hours | 3.8% |
| 20 hours | 1.8% |

From the foregoing it is evident that the longer the ceramic chips are fired, the better they sinter and the dissipation factor improves.

Electrical properties of the chips fired for two hours were:

Dielectric constant = 2316
Insulation resistance at 25° C = $2 \times 10^{12}$ ohms
Insulation resistance at 125° C = $4 \times 10^{10}$ ohms The dielectric constant varied from its value at 25° C from 12% to 38% over a temperature range of −50° C to 120° C. At 20° C, the dielectric constant was the highest equalling 2316.

EXAMPLE 3

Some of the chips formed in accord with Example 2 were fired or sintered at 900° C for 12 hours. Percent variation of the dielectric constant with various temperature changes where the dielectric constant = 5200 at 25° C are summarized in the following table:

| Percent variation | Temperature in degrees C |
| --- | --- |
| −16% | 50° C |
| −40% | 75° C |
| −60% | 100° C |
| −68% | 125° C |
| −7% | 0° C |
| −22% | −20° C |
| −46% | −50° C |

The dissipation factor at 20° C was 1.4%, at 125° C was 0.9% and at −50° C was 3.7%.

EXAMPLE 4

The ceramic composition of Example 2 was cast in a tape 1.55 mil thick. A design incorporating 31 metal layers at this green tape thickness was formed into chips. Because of the relatively large size, these chips were pre-heated very slowly from room temperature to 260° C over a period of 96 hours. This calcining eliminated almost all of the organic material from the chips. The chips were then fired or sintered at 870° C for 20 hours. After firing, they were terminated with commercial termination silver material using conventional methods.

The electrical properties of these chips were:
Capacitance = 2.10 microfarads and dielectric constant = 4100 at 25° C.

The dissipation factor was 1.5% at 25° C.

Insulation resistance was 1500 megohms at 25° C and 400 megohms at 85° C, this insulation resistance being measured at 100 volts D.C.

The change in capacitance and dissipation factor with respect to temperature are summarized in the following table:

| Temp. ° C | Change in Capacitance | Dissipation Factor |
| --- | --- | --- |
| 25° C | 0 | 1.5% |
| 50° C | −18% | 0.8% |
| 75° C | −41% | 0.6% |
| 100° C | −49% | 0.5% |
| 0° C | −8% | 1.8% |
| −50° C | −53% | 3.5% |

EXAMPLE 5

98% by weight of commercial barium titanate was dry mixed with 2.0% by weight lithium fluoride. This mixture was calcined at 788° C for 1 hour. The calcined material was wet mixed with 0.2% by weight ferrous oxide and 0.2% by weight silicon dioxide. The mixture was dried and the dry powder cast into tape as described in Example 1, the tape thickness being 1.4 mil. Green chips similar to Example 1 but with 11 metal layers were made. These chips were fired or sintered at 900° F for 14 hours.

Electrical properties were:
Capacitance = 0.27 microfarads
Dielectric constant = 5225
Dissipation factor = 2%
Insulation resistance 15,000 megohms at 25° C, 8500 megohms at 85° C and 300 megohms at 125° C.

The variation in capacitance with temperature is summarized in the following table:

| Capacitance Change | Temperature |
| --- | --- |
| 0% | 25° C |
| 25% | 50° C |
| −56% | 75° C |
| −70% | 100° C |
| +11% | 0° C |
| −1% | −25° C |
| −30% | −50° C |

EXAMPLE 6

73% by weight barium titanate, 25% by weight strontium titanate, and 2% by weight lithium fluoride was dry mixed and pressed into disc form and fired or sintered at 900° C for 16 hours. Simultaneously, silver electrodes were fired on the disc.

The electrical properties were:
Dielectric constant = 4000 at 25° C
Dissipation factor = 1.6% at 25° C The change in capacitance at different temperatures is summarized in the following table:

| Change in Capacitance | Temperature |
| --- | --- |
| 0.0% | 25° C |
| −27.0% | 50° C |
| −58% | 75° C |

-continued

| Change in Capacitance | Temperature |
|---|---|
| −70% | 100° C |
| −76% | 125° C |
| −4% | 0° C |
| −17% | −25° C |
| −29% | −50° C |

EXAMPLE 7

97% by weight barium titanate was dry mixed with 2% by weight barium fluoride and 1% by weight lithium fluoride. This mixture was calcined at 650° C for 1 hour. The calcined material was then wet-mixed, dried, and the dry powder cast into tape as described in Example 1. The tape thickness was from 1.8 to 2.0 mils.

Green chips were formed similar to the manner described in Example 1 with 11 metal layers. These chips were fired or sintered at 880° C for 16 hours.

The electrical properties were:
Dielectric constant = 2338
Dissipation factor = 1.35%

The temperature coefficient of capacitance varied from 1% to −18% over a temperature range of from −55° C to +125° C. This temperature characteristic meets the X5R characteristic as defined by the Electronics Industries Association of the USA for general purpose ceramic capacitors.

EXAMPLE 8

Essentially the same chips were produced as set forth in Example 7 except that the composition was 95% barium titanate mixed with 4% by weight barium fluoride and 1% by weight lithium fluoride. The sintering or firing temperature and length of time were the same as in Example 7.

The electrical characteristics were:
Dielectric constant = 2643
Dissipation factor = 1.45%

The temperature coefficient of capacitance was within 15% of its value at 25° C over a temperature range of −55° C to +125° C. These values correspond to the X7R characteristics of the Electronics Industries Association of the USA.

One further example constituting the preferred embodiment of this invention is now described as follows:

A ceramic composition for forming a multi-layer ceramic capacitor included a mixture, within plus or minus one percent by weight, the following:
94.82% barium titanate
1.96% lithium fluoride
0.81% manganese nitrate
0.24% cerium oxide
0.95% cobalt nitrate
1.22% niobium oxalate The foregoing mixture was calcined and at this time, the nitrates of cobalt and manganese decomposed and converted to oxides which react with the other components. Niobium oxalate also decomposes and forms niobium oxide during calcining.

The calcined material was well milled in a vibratory energy mill for 16 hours, the powder dried and a casting slurry was made as described in Example 1.

Ceramic tape was then cast at 1.3 mil thickness and electrodes silk-screened with a silver paste containing 53% by weight silver. The actual deposited electrodes were 100% silver. Chips were formed from 36 metal layers separated by the 1.3 mil green ceramic.

The foregoing chips were then placed on zirconia setters and heated slowly from room temperature to 260° C over a period of 96 hours. Thereafter, the chips were fired or sintered in a separate tunnel kiln at 870° C for 10 hours. The chips were then terminated in a normal fashion with appropriate end electrodes.

The electrical properties were:
Capacitance = 2.310 microfarads
Dielectric constant = 3370
Dissipation factor = 1.6%

The change in capacitance with temperature is summarized in the following table:

| Change in Capacitance | Temperature |
|---|---|
| 0.0% | 25° C |
| −22.0% | 50° C |
| −41.0% | 75° C |
| −55.0% | 100° C |
| −70.0% | 125° C |
| −5.0% | 0° C |
| −17.0% | −25° C |
| −30.0% | −50° C |

From all of the foregoing examples, it will be understood that lithium fluoride helps to sinter barium titanate at much lower temperatures. Lithium fluoride also shifts the Curie peak of barium titanate to lower temperatures and these bodies have useful temperature coefficients of capacitance high dielectric constants, low dissipation factor and good insulation resistance to make useful capacitors.

The compositions with lithium fluoride are adaptable to multi-layer ceramic capacitor applications. They allow the use of silver electrodes which is much less expensive than other conventional precious metal electrodes such as platinum, palladium and gold and alloys thereof.

It should be understood by those familiar with ceramic technology that one can easily add to the barium titanate ceramic with lithium fluoride a variety of oxides and fluoride compounds. These ceramics can be fired at higher temperatures with shorter time. In these instances one would use a higher melting silver alloy electrode such as 30% by weight palladium and 70% by weight silver which could readily be fired at 1093° C. The electrode composition, could, of course, be modified by adding small amounts of platinum and gold.

In summary, the process of this invention involves the making of a multi-layer ceramic capacitor in which the electrodes are formulated from at least 50% by weight of silver the balance preferably consisting of palladium. The basic process steps include the forming of the ceramic composition by weight of at least 50% barium titanate and from 0.25% to 10% lithium fluoride and then sintering the composition at a temperature between 750° C and 1250° C.

In the preferred process, the step of forming the ceramic composition results in a composition including, by weight, from 90% to 95% barium titanate and from 1.0% to 3.0% lithium fluoride and in which the sintering step is carried out between 850° C and 900° C.

From all of the foregoing, it will thus be evident that the present invention enables the manufacture of multi-layer ceramic capacitors for substantially less expense than has been necessary heretofore by the use of silver as a major component making up the electrodes. This use is permitted by the lower sintering temperature realizable as a consequence of utilizing the barium titanate-lithium fluoride system in the ceramic composition.

We claim:

1. A multi layer ceramic capacitor comprising, in combination:
   (a) a plurality of ceramic tape pieces;
   (b) electrodes on the surfaces of the pieces with some of the pieces having electrodes terminating adjacent to their front edges and the remaining pieces having the electrodes terminating adjacent to their rear edges, the pieces with the electrodes terminating adjacent to their front edges being sandwiched between said remaining pieces to provide a stack;
   (c) top and bottom ceramic pieces without any electrodes positioned on the top and bottom of said stack to provide a multi layer ceramic capacitor with buried electrodes, the ceramic composition of each of said ceramic tape pieces including, by weight:
      (1) at least 50% barium titanate, and
      (2) from 0.25% to 10% lithium fluoride, and the electrode composition of each of the buried electrodes including, by weight, at least 50% silver.

2. A capacitor according to claim 1, in which said ceramic composition further includes by weight from 0.1% to 30% strontium titanate.

3. A capacitor according to claim 1, in which said ceramic composition further includes by weight from 0.1% to 2% barium fluoride.

4. A capacitor according to claim 1, in which the balance of the electrode composition consists of palladium.

5. A multi layer ceramic capacitor comprising in combination:
   (a) a plurality of ceramic tape pieces;
   (b) electrodes on the surfaces of the pieces with some of the pieces having electrodes terminating adjacent to their front edges and the remaining pieces having the electrodes terminating adjacent to their rear edges, the pieces with the electrodes terminating adjacent to their front edges being sandwiched between said remaining pieces to provide a stack;
   (c) top and bottom ceramic pieces without any electrodes positioned on the top and bottom of said stack to provide a multi layer ceramic capacitor with buried electrodes, the ceramic composition of each of said ceramic tape pieces including, within plus or minus 1% by weight:
      94.82% barium titanate
      1.96% lithium fluoride
      0.81% manganese nitrate
      0.24% cerium oxide
      0.95% cobalt nitrate
      1.22% niobium oxalate; and the electrode composition of each of said buried electrodes being substantially 100% pure silver.

6. A process of making a multi-layer ceramic capacitor including the steps of:
   (a) forming a ceramic tape composition of, by weight, at least 50% barium titanate and from 0.25% to 10% lithium fluoride;
   (b) cutting the ceramic tape to provide a plurality of ceramic tape pieces;
   (c) forming an electrode composition of silver and palladium in which there is provided at least 50% by weight of silver;
   (d) silkscreening said electrode composition on the surfaces of the tape pieces with some of the pieces having the electrodes terminating adjacent to their front edges and the remaining pieces having the electrodes terminating adjacent to their rear edges;
   (e) sandwiching the pieces with the electrodes terminating adjacent to their front edges between the remaining pieces to provide a stack;
   (f) affixing ceramic pieces without any electrodes on the top and bottom of said stack to provide a multilayer ceramic capacitor with buried electrodes; and
   (g) sintering the composition at a temperature between 750° C and 1250° C.

7. The process of claim 6, in which the step of forming the ceramic composition results in a composition including, by weight, from 90%-95% barium titanate and from 1.0% to 3.0% lithium fluoride and in which the step of sintering said composition is carried out between 850° C and 900° C.

* * * * *